(12) United States Patent
Maldonado Pardo

(10) Patent No.: US 9,685,775 B2
(45) Date of Patent: Jun. 20, 2017

(54) VARIABLE ELECTRIC FIELD BALANCING DEVICE

(71) Applicant: DINNTECO INTERNATIONAL, S.L., Andorra la Vella (AD)

(72) Inventor: Antonio Javier Maldonado Pardo, Andorra la Vella (AD)

(73) Assignee: DINNTECO INTERNATIONAL, S.L., Andorra la Vella (AD)

( * ) Notice: Subject to any disclaimer, the term of this patent is extended or adjusted under 35 U.S.C. 154(b) by 0 days.

(21) Appl. No.: 14/985,708

(22) Filed: Dec. 31, 2015

(65) Prior Publication Data

US 2016/0285248 A1 Sep. 29, 2016

(30) Foreign Application Priority Data

Mar. 24, 2015 (ES) .................................. 201530389

(51) Int. Cl.
    *H02G 13/00* (2006.01)
(52) U.S. Cl.
    CPC .............. *H02G 13/80* (2013.01); *H02G 13/00* (2013.01); *H02G 13/40* (2013.01)
(58) Field of Classification Search
    CPC combination set(s) only.
    See application file for complete search history.

(56) References Cited

U.S. PATENT DOCUMENTS

| 3,662,083 A * | 5/1972 | Constant | H02G 13/00 |
| | | | 174/4 C |
| 4,926,284 A * | 5/1990 | Eugenio | H02G 13/80 |
| | | | 174/3 |

FOREIGN PATENT DOCUMENTS

| EP | 0228984 A2 | 7/1987 |
| EP | 1958306 A | 8/2008 |

OTHER PUBLICATIONS

The Spanish State of the Art Report dated Apr. 20, 2015 for Spanish Application No. 201530389 filed Mar. 24, 2015.

* cited by examiner

*Primary Examiner* — Dhirubhai R Patel
(74) *Attorney, Agent, or Firm* — Avery N. Goldstein; Blue Filament Law PLLC

(57) ABSTRACT

Variable electric field balancing device formed by a hollow assembly that, with geometric shapes that can be different on the outside, includes an upper passive capture element (2), as a capture electrode, a lower passive capture element (3), as a reception electrode, and an insulator element (4) that keeps them separated from each other at a distance (d) dependent on the conductivity coefficient of the materials, and that, also, externally covers the lower element (3) like a skirt to the lower base of the same, preventing the impact of a lightning bolt on the lower element (3) from being able to induce the generation of an upward leader, and there is also an expansion and compression valve (5) that connects the outside to the inside of the hollow assembly and which expands in phases of passage of current and/or absorption of external induced surges, and compressed at the end of the compensation of the field.

7 Claims, 1 Drawing Sheet

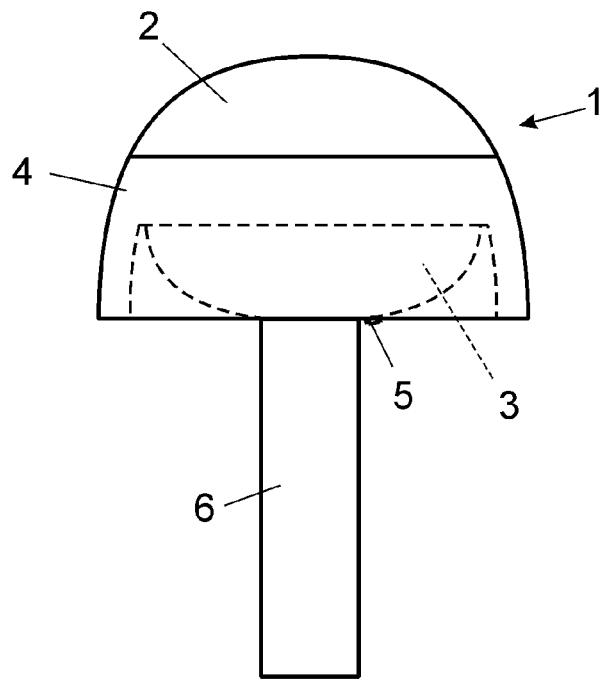
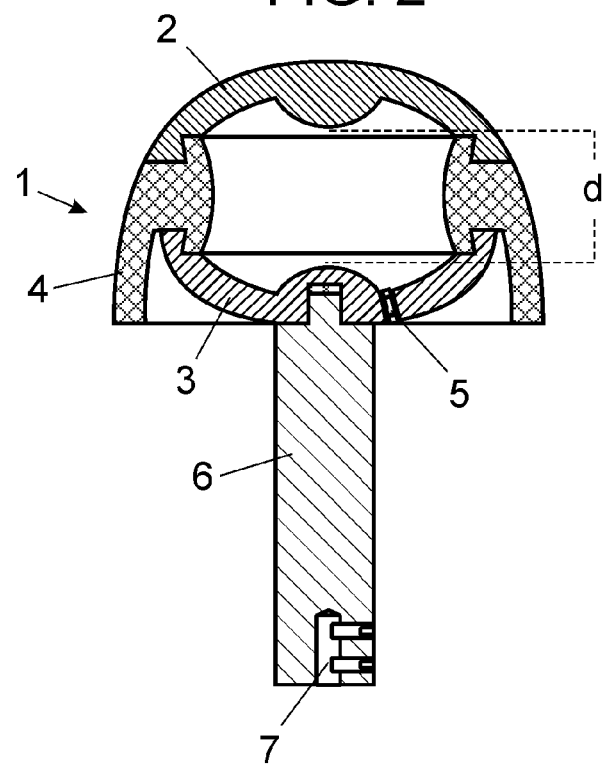

VARIABLE ELECTRIC FIELD BALANCING DEVICE

OBJECT OF THE INVENTION

The invention, as expressed in the title of this patent specification, refers to a variable electric field balancing device, which has advantages and new features, which will be explained in detail below, which are an improvement on the current state-of-the-art.

The object of the present invention focuses specifically on a device the purpose of which is to protect people, animals and installations on land and at sea from direct atmospheric electric discharges and minimize, to tolerable limits, external induced surges from impacts of lightning in areas near to the protected installations, for which, by means of a capture electrode and a reception electrode isolated from each other and an expansion and compression valve, it makes a compensation of the electric field in its immediate vicinity whenever the latter suffers a variation, with the saturation of the electric field underneath the limit that can lead to the rupture of the dielectric of the air and, thus, the joining of the downward leader with the potential upward leader generated in the device.

TECHNICAL FIELD OF THE INVENTION

The technical field of the present invention is part of the industrial sector dedicated to the manufacture of equipment and devices for protection against atmospheric electric discharges.

BACKGROUND OF THE INVENTION

According to the scientific community, the standards of current lightning conductors and different manufacturers, currently, among atmospheric discharge protection systems, Franklin type passive capture systems, in general, are the most accepted, although it should be remembered that they are systems that are essentially composed, as is known, of a metal mast with a capture head protruding above a building that is joined to an electrical earth connection by means of a copper conductor that is made using metal spikes, compensating the electric field immediately, in other words, in microseconds, so that when there is a difference of approximate potential, between the downward leader and the upward leader that generate around 500 KV, when the lightning strike appears on the capture different electric and electromagnetic effects are originated on the capture itself and on the structure they protect that, depending on the intensity transported by the lightning bolt (something that can never be known in advance), will generate destruction of the protected installation and/or damages to people or animals with unpredictable consequences.

Also, specialists in this area have evaluated on numerous occasions early streamer emission lightning conductors, concluding that these systems have failed to prove their effectiveness to attract lightning in less time than a passive capture system, basically due to the fact that the additional load they generate on the tip of the capture, by means of the energy the early streamer emission device can store, does not affect the so-called impact distance.

They have also evaluated the so-called CTS (Charge Transfer System) systems, concluding that there are no scientific arguments or experimental evidence to support the possibility of preventing, by means of a CTS, a lightning bolt from impacting a structure if the conditions for it are given. The charge emitted by the typical system, in storm conditions, is negligible compared to that of a guide or downward leader. Registering of impacts in this type of installations shows that, at best, they can be relied upon as conventional captures.

In view of these studies and scientific assessments, and bearing in mind that both the charges generated in the cloud and those generated on land, are unlimited and, in no event, can a spatial charge be generated that is large enough to be able to compensate the electric field in the vicinity of the structure, precisely because the generation of these charges is much higher than the compensated spatial charge and, therefore, negligible, it becomes clear that the only way to prevent a lightning strike on a structure is preventing the capture system from generating the upward leader, for which it will be necessary to make the electric field associated to the capture itself drop constantly and during the time of the formation of the storm, that, in any event, will vary constantly, and the device object of this invention is based on achieving this effect.

EXPLANATION OF THE INVENTION

The variable electric field balancing device proposed by the invention is, therefore, based on avoiding the above, and accepting that, in any case, the device will be limited to work within the real nature, which will depend on the speed of generation the possible lightning bolt, in other words, the speed of increase of the electric field and its reaching its saturation limit, depending on the rate of generation of leakage currents, at the onset of intermittent and/or successive electric field variations in its work environment, and this device manages to generate a compensation of the electric field in its immediate vicinity, thereby preventing that the field, in this environment, can reach its saturation limit.

This electric field compensation, in no event depends on the amount of existing charges in the environment, since they are unlimited and a significant deionization cannot be caused on the protected structure and/or immediate vicinity of the capture system, and it is also totally impossible to inhibit the formation of a lightning bolt in a stormy system, but what can be achieved is a compensation of the electric field in such an environment that lowers the saturation limit of the same, preventing it from having the time needed to be able to generate enough potential for an upward leader to appear and prevent the lightning bolt from impacting the protected structure. Therefore, the variable electric field balancing device of this invention acts preventing the generation of upward leaders on it and on the structure it protects.

In a specific way, therefore, what the invention proposes is a device intended to make a compensation of the electric field existing in its immediate vicinity, every time that it undergoes a change, however small, placing the saturation of the electric field in the area below the limit which could lead to rupture of the dielectric of the air and therefore the joining of the downward leader generated with the upward leader potentially generated in the device.

Such compensation, which will be constant, successive and/or sequential, according to variations of field existing in the area, the device of the invention ensures not generating the upward leader. In this way the potential electric and electromagnetic effects on protected structures and/or persons and/or animals that are located in the protection zones are very considerably minimized.

For this, the device is formed from an upper passive capture element, which acts as a capture electrode, a lower passive capture element, which acts as a reception electrode, and an insulator element that is arranged between the two the geometry of which is such that as well as covering up to the lower part of the reception electrode, to generate the protection insulation suitable for preventing a lightning impact on the lower element in the event that this reception element can potentially lead to inducing the generation of an upward leader, due to being incapable of conducting with the adequate speeds the current leakage from the system includes the assembly of the three elements described above.

It is important to point out that this arrangement and geometry of the insulator element, covering up to the lower base of the lower passive capture element, is essential for the proper functioning of the device.

Furthermore, in the device of the invention the incorporation, in the lower base of the lower passive capture element, an expansion and compression valve in charge of the current passage of current and/or absorption of the external induced surges is considered.

Thus, this valve is configured in such a way that it expands when a there is a leakage current and ejects the overpressure generated in the process. And, once the capture assembly, consisting of an upper passive capture element, or capture electrode, the lower passive capture element, or reception electrode, and the insulator element, have finished the compensation of the field temporarily, the valve compresses and stops acting.

This valve is, therefore, a basic element of the device, because without it, the capture assembly could be destroyed in any of the field compensation processes generated.

If the overpressure generated within the capture assembly can potentially lead to exceeding its working limit, which will be approximately in the order of 200 kA and, therefore, the device may be destroyed, the expansion and compression valve also acts like a safety valve and will jump out of its location, preventing the overpressure from destroying the device. Logically, when this situation occurs the device will stop working until the valve is returned.

It is worth mentioning, also, that the capture assembly is arranged on a fastening mast, which has a connector to earth and that will only serve as an anchoring element to properly position the device in the structure to be protected.

For its part, the positioning will be carried out by placing the device vertically and preferably at a distance of at least 80 cm from the highest point of the structure. Structures individually or zones may be protected, for which, there must be several devices as a perimeter protection, depending on their coverage radius, connected to the earthing system together and attached to a common earth connection that works as a final place where the different current leakages can end up.

Also, depending on the type of structure and/or zone to be protected, and its level of risk, the device may have different designs and use different types of materials.

Thus, the upper passive capture element and the lower passive capture element may have various geometric shapes on the outside, which will depend on the protection needs of the structures.

Finally, it is noteworthy that, for the proposed balancing device to function properly, the distance between the upper passive capture element and the lower passive capture element will have to have a relationship dependent on the conductivity coefficient of the materials of the elements and on the intermediate insulating element, a relationship that will be basic for the effectiveness of its functioning.

The variable electric field balancing device consists, therefore, of an innovative structure with features unknown until now for the purpose it is designed for, reasons which linked to its practical usefulness, give it sufficient grounds for obtaining the exclusive privilege that is applied for.

DESCRIPTION OF THE DRAWINGS

To complement the description being made and in order to aid a better understanding of the characteristics of the invention, the present descriptive report is accompanied, as an integral part thereof, by a drawing in which by way of an illustration and not limited to the following has been represented:

FIG. 1 shows a schematic elevation view of an exemplary embodiment of the variable electric field balancing device, object of the invention, seeing in it its general external configuration and the main parts and elements it includes, having also represented, by dashed lines, the profile of the lower passive capture element profile element, showing how it is covered and hidden underneath the insulating element; and FIG. 2 shows a sectional view, according to a vertical section, of the same example of the device of the invention shown in FIG. 1, where the configuration and arrangement of its parts internally can be seen.

PREFERRED EMBODIMENT OF THE INVENTION

In view of the described figures, and in accordance with the numbering used, we can see therein an exemplary preferred embodiment, which should not be considered as limiting, of the variable electric field balancing device of the invention, which includes the parts and elements indicated and described in detail below.

Thus, as seen in the figures, the device (1) in question is made from a hollow assembly that includes an upper passive capture element (2), which acts as a capture electrode, and a lower passive capture element (3), which acts as a reception electrode, and both elements (2, 3) may have various geometrical shapes on their outside, for example hemispherical as in the example shown, and an electric insulator element (4) arranged between the upper (2) and lower (3) elements keeping them separated from each other at a distance (d) that will depend on the conductivity coefficient of the materials the elements are composed of, and the geometry of which, of this insulator element, (4) is such that, besides internally separating the two elements, externally covers the lower element (3) like a skirt until the level of the lower base of it is reached, preventing this way the impact of a lightning bolt on the lower element (3) and that can potentially lead to inducing the generation of an upward leader.

Further, preferably in the lower base of the lower passive capture element (3) of reception, the device incorporates an expansion and compression valve (5) that connects the outside with the inside of the hollow assembly and which expands in the passage of current and/or absorption of external induced surges phases, and that is compressed at the end of the compensation of the field.

This valve (5), furthermore, is also a safety valve that will jump out of its location, in the event that the overpressure generated within the hollow assembly constituting the upper capture element (2), the upper element (3) of reception and the insulator element (4) exceeds its working limit.

In addition, this assembly is arranged coupled on a fastening mast (6) to anchor it to the structure to be protected, which has a connection (7) for earthing.

With all the above, the device performs the compensation of the electric field existing in its immediate vicinity every time the latter undergoes a change, usually caused by a lightning bolt, situating the saturation of the electric field below the limit that can cause damage to the dielectric of the air and, therefore, the joining of the downward leader generated with the potential upward leader generated in the device.

Having sufficiently described the nature of this invention, as well as how to put it into practice, it is not considered necessary to elaborate on its explanation for any expert in the art to understand its scope and the advantages that originate from it, stating that, in its essence, it may be put into practice in other embodiments which differ in detail from that indicated by way of example, and which are also covered by the protection claimed provided that it does not alter, change or modify its fundamental principle.

The invention claimed is:

1. A variable electric field balancing device comprising conductive capture elements separated by an electrical insulator incorporated on a mast (6) with earth connection (7), wherein the variable electric field balancing device further comprises a hollow assembly comprising an upper passive capture element (2), which acts as a capture electrode, and a lower passive capture element (3), which acts as a reception electrode, and both elements (2, 3) may have various geometric shapes on the outside, and an insulator element (4) arranged between said upper (2) and lower (3) elements maintaining them separated from each other at a variable distance (d) dependent on the conductivity coefficient of a set of materials said elements (2 and 3) are composed of, and a geometry of which, of the insulator element (4) is such that, in addition to internally separating the two elements, the insulator element externally covers the lower element (3) like a skirt to a lower base thereof, preventing the impact of a lightning bolt on said lower element (3) from being able to induce the generation of an upward leader, and it also has an expansion and compression valve (5) that connects an outer portion to an inner portion of the hollow assembly and which expands in phases of passage of current, absorption of external induced surges, or a combination thereof and is compressed at an end of a compensation of the variable electric field.

2. The variable electric field balancing device, according to claim 1, wherein the upper passive capture element (2) and the lower passive capture element (3) have a hemispherical outer configuration.

3. The variable electric field balancing device, according to claim 2, wherein the valve (5) is, also, a safety valve that jumps out of its location when the overpressure generated within the hollow assembly that is formed by the upper capture element (2) and the lower reception element (3) and the insulator element (4) exceed their working limit.

4. The variable electric field balancing device, according to claim 2, wherein the valve (5) is incorporated in the lower base of the lower passive capture element (3) of reception.

5. The variable electric field balancing device, according to claim 1, wherein the valve (5) is, also, a safety valve that jumps out of its location when the overpressure generated within the hollow assembly that is formed by the upper capture element (2) and the lower reception element (3) and the insulator element (4) exceed their working limit.

6. The variable electric field balancing device, according to claim 5, wherein the valve (5) is incorporated in the lower base of the lower passive capture element (3) of reception.

7. The variable electric field balancing device, according to claim 1, wherein the valve (5) is incorporated in the lower base of the lower passive capture element (3) of reception.

* * * * *